XR 3,191,157 CROSS REFERENCE SEARCH ROOM

TX3085H
X3083Y

Y2530

June 22, 1965 D. J. PARKER ETAL 3,191,157

OPTICAL MEMORY

Filed Jan. 21, 1960 4 Sheets-Sheet 1

INVENTORS
DONALD J. PARKER,
THOMAS I. RESS &
HARRY J. WOLL
BY John V. Regan
ATTORNEY

3191157
OR IN 340/173LT

INVENTORS
DONALD J. PARKER,
THOMAS I. RESS &
BY HARRY J. WOLL
John V. Regan
ATTORNEY June 22, 1965 D. J. PARKER ETAL 3,191,157
OPTICAL MEMORY
Filed Jan. 21, 1960 4 Sheets-Sheet 3

INVENTORS
DONALD J. PARKER,
THOMAS I. RESS &
BY HARRY J. WOLL
John V. Regan
ATTORNEY INVENTORS
DONALD J. PARKER,
THOMAS I. RESS &
BY HARRY J. WOLL
John V. Regan
ATTORNEY 3,191,157
Patented June 22, 1965

3,191,157
OPTICAL MEMORY

Donald J. Parker, Merchantville, N.J., Thomas I. Ress, Woodland Hills, Calif., and Harry J. Woll, Haddon Heights, N.J., assignors to Radio Corporation of America, a corporation of Delaware Filed Jan. 21, 1960, Ser. No. 3,921
12 Claims. (Cl. 340—173)

The present invention relates to a new and improved random access memory. Important features of the invention include very high access speed, very high capacity, very dense packing, and the absence of moving parts.

Memories (data storage systems) for high speed digital computers should be capable of storing large quantities of data and should have very rapid access to any portion of the data (high speed). Unfortunately, these requirements are often conflicting. For example, storage systems employing tapes, drums, photographic disks, cards and so on have relatively large storage capacities but relatively long access times. On the other hand, storage systems which employ cores, ferrite plates, twisters, cryotrons, and the like have relatively rapid access times but relatively low capacities. As a result, memories presently in commercial use are compromises in the sense that their storage capacity is not as great as is possible and their access time is also not as fast as is possible. For example, these computers use combinations of large capacity slow access storage systems and small capacity fast access storage systems.

The extraordinarily high packing density obtainable on photographic emulsions and the extremely low cost-per-bit of the basic memory element make photoscopic memories particularly attractive as high capacity storage systems. With the requirement of access times approaching one millisecond and less, however, mechanical scanning used by photoscopic devices, even when the scanning is only in one coordinate, becomes less and less feasible. Material strength limitations associated with the extremely high velocities needed become intolerable, since speeds of 60,000 r.p.m. or more are implied. In addition, access is necessarily serial, not random, in the mechanically scanned coordinate. Such serial access demands extreme electrical bandwidths and, hence, very high light intensities for adequate signal-to-noise ratio. Thus, a completely electronic approach, with its substantially inertialess scanning, seems indispensable to a solution of the present requirement.

Conventional electronic-scanning approaches are immediately faced with storage capacity limitations. Optimistically, a cathode-ray tube, or camera tube, might satisfactorily resolve in the neighborhood of 1500 bits along a screen diameter, which represents a total resolution capability of $1.77 \times 10^6$ bits for the entire screen. For a memory having a capacity of $10^8$ bits, over 50 such units would be needed and for one having a capacity of $10^9$ bits, over 500 such units would be needed. Perhaps even more serious, extreme or unattainable precision in beam deflections would be required.

The present invention includes an optical storage medium, means for selecting a sub-area on the medium, means for magnifying the sub-area, and means for selecting a portion of the magnified sub-area. The storage medium itself may include a photographic plate which has translucent or transparent marks (small transparent squares, for example) indicative of binary digits of one type such as binary zero, and opaque marks (small black squares, for example) indicative of binary digits of another type, such as binary one. A sub-area on the photographic plate includes a large number of marks, such as $10^4$ marks, for example. A sub-area on the plate is selected by electronic means such as a cathode ray tube the beam of which is deflected to illuminate the sub-area. An optical device may be utilized to optically superimpose all the sub-areas, so that a single scanning device may be employed to select the desired mark of the sub-area. This scanning device may include an image receiving surface on which a light image of the sub-area is projected, means to transform the light image into an electron image, and means for scanning the electron image for selecting a desired bit in the electron image.

The invention will be described in greater detail by reference to the following description taken in connection with the accompanying drawing in which.

Figure 4A:
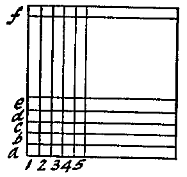
FIG. 4 is a schematic view of an optical tunnel to illustrate the manner in which it operates.
Figure 4:
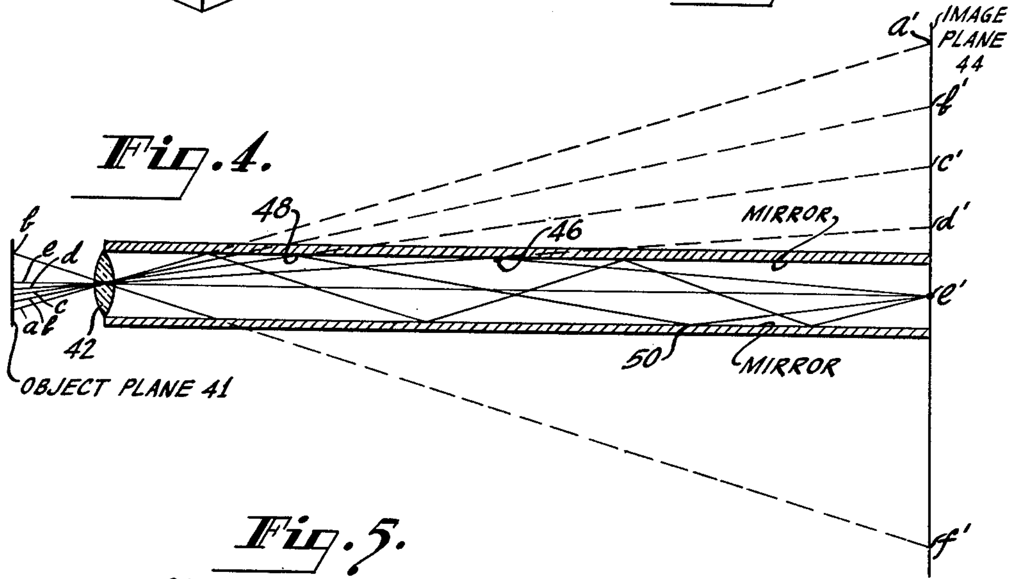
Figure 5:
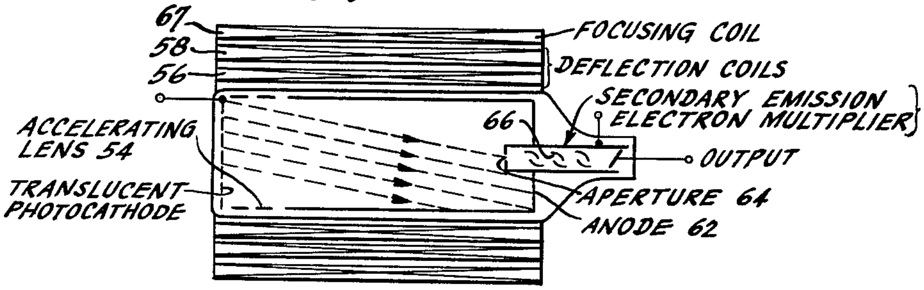
Figure 6:
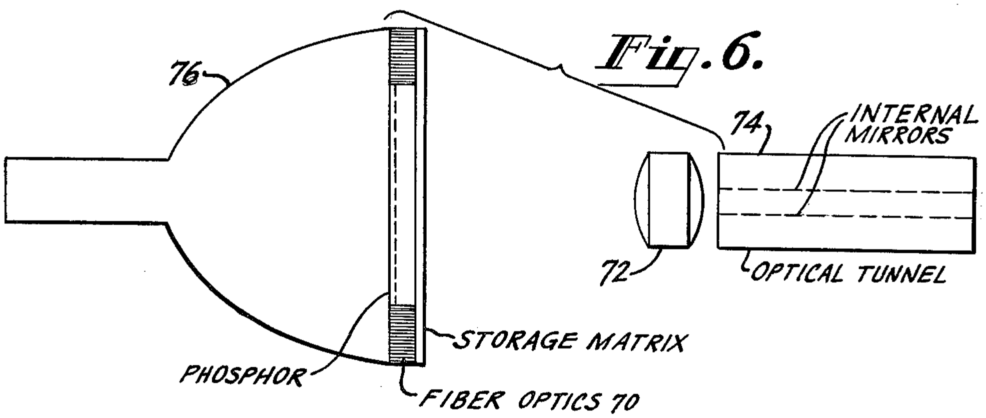
Figure 7:
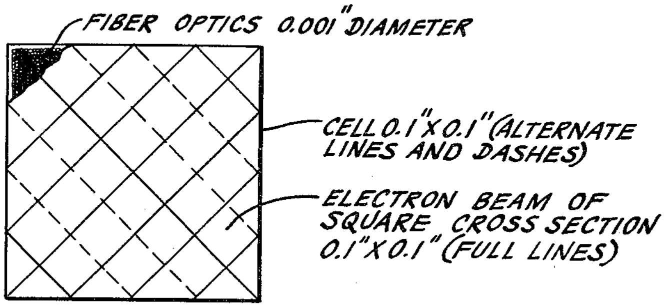
Figure 8:
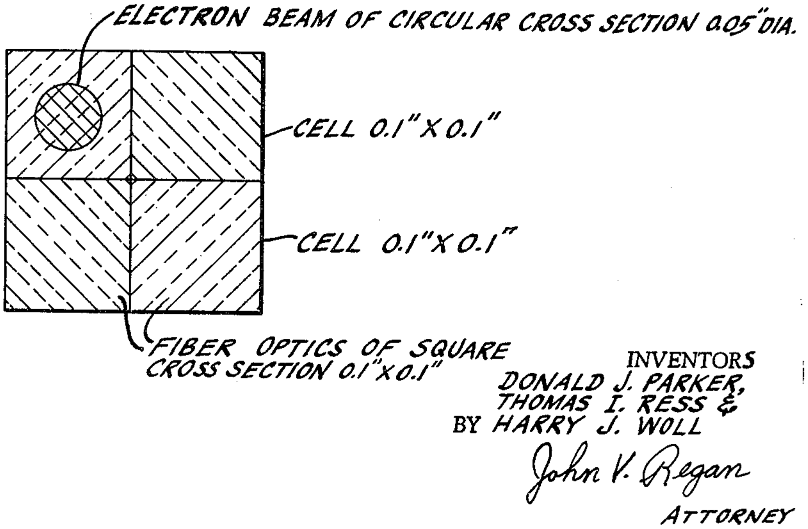
Figure 9:
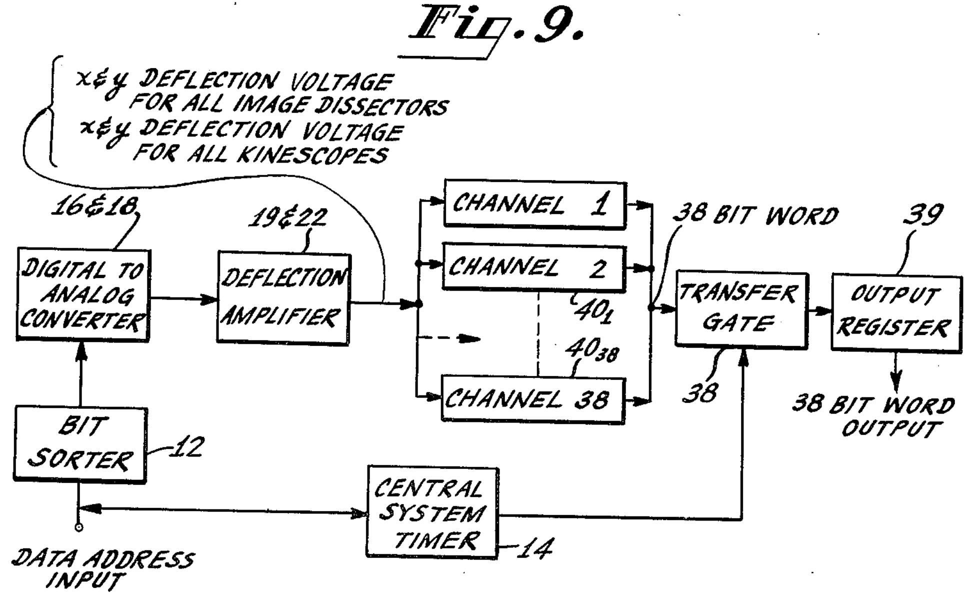
Figure 10:
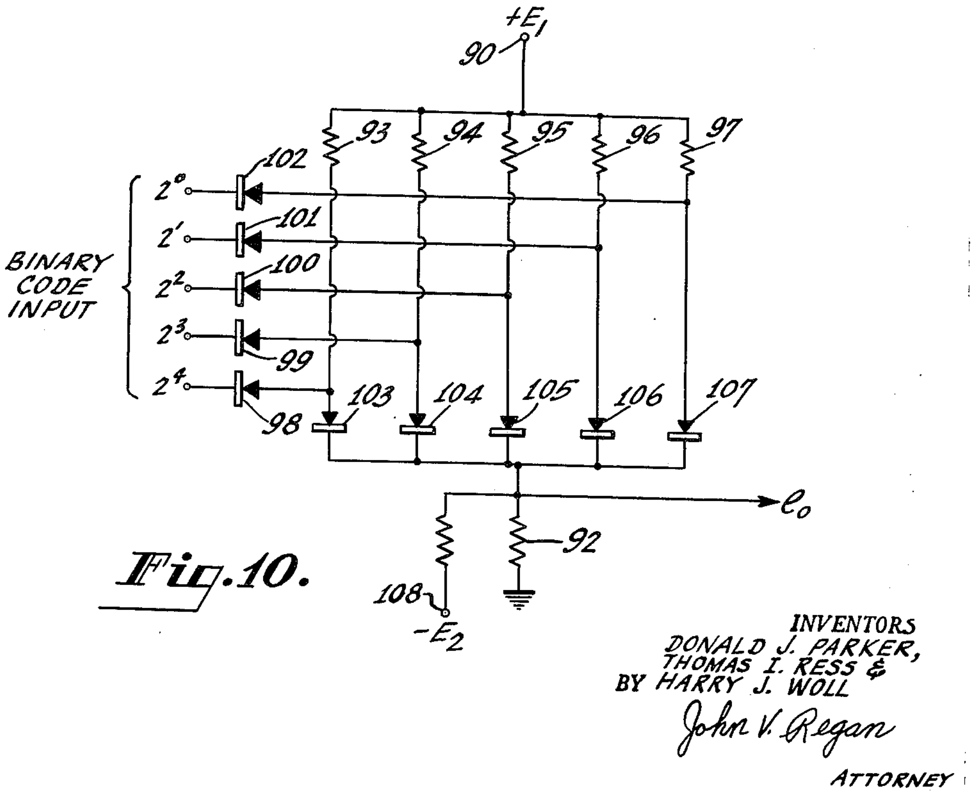

FIG. 4*a* is a sketch of the object plane in FIG. 4;

FIG. 5 is a schematic drawing of an image dissector;

FIG. 6 is a schematic drawing of a modified portion of a memory system according to the present invention;

FIGS. 7 and 8 are schematic representations of different ways in which a cell in the optical matrix may be illuminated according to the present invention;

FIG. 9 is a block circuit diagram of a complete memory according to the present invention; and FIG. 10 is a schematic diagram of a digital-to-analog converter which may be used in the memory system of the invention.

*Optical storage matrix*

Figures 1, 2:
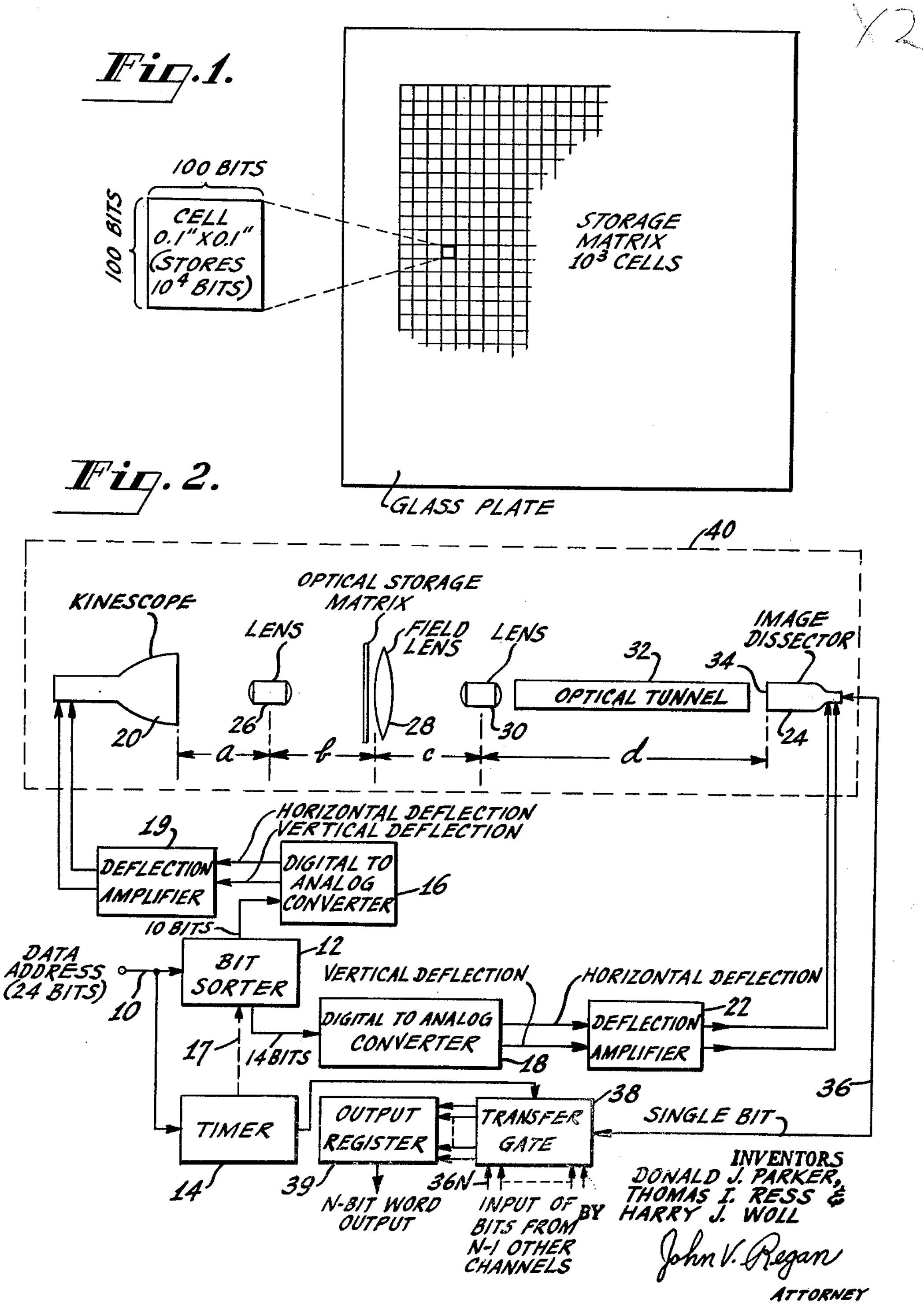
FIG. 1 is a schematic view of an optical storage matrix according to the present invention.
FIG. 2 is a block and schematic diagram of a portion of a memory system according to the present invention in which the optical matrix of FIG. 1 is employed.

A storage matrix according to the present invention is shown in FIG. 1. It consists of a photographic plate which is subdivided into sub-areas hereafter termed cells. Each cell permanently stores information as a large number of opaque and translucent (or transparent) marks (bits). For the purpose of the discussion which follows, assume that the plate is 4″ x 4″ and, as can be seen in the expanded view of the cell, each cell is 0.1″ x 0.1″ on side. Assume also that there are 1000 cells per matrix and each cell stores 100 bits by 100 bits or 10,000 bits. Each bit then occupies a square $10^{-3}$″ x $10^{-3}$″. An opaque mark may represent a binary digit of one type such as binary one and transparent mark a binary digit of another type such as binary zero. Since there are $10^3$ cells in the storage matrix and each cell stores $10^4$ bits, each storage matrix stores a total of $10^7$ bits. It is to be understood that the dimensions, number of bits and other parameters given here and elsewhere in the application are by way of example only.

The optical matrix may be made in a number of ways. For example, enlarged drawings may be made of the cells and photographed in reduced size onto the appropriate place and in the appropriate position in the optical matrix. More elaborate techniques may also be employed. For example, suppose it is desired to make up N matrices where N is a number such as 20, 30, 50 or the like. The information to be recorded may first be prepared on a magnetic tape with parallel tracks, where each track corresponds to a matrix. For example, a 2″ magnetic tape can easily handle 30 or 40 or so parallel tracks. The information on each track consists of a signal of one amplitude for the binary digit one and a signal of another amplitude for the binary digit zero. The signal from a track is applied to intensity modulate the cathode ray beam of a kinescope. The beam is simultaneously scanned in $x$ and $y$ coordinates in usual television fashion to produce on the kinescope screen the image of one cell. Each cell display of 100 by 100 bits is then photographed on 16 millimeter film as a frame. Note that ordinary good film and lens combinations can be used in the process since only one cell at a time is being handled. An entire tap track (one matrix) may be recorded into about 35 feet of film.

After processing, each intermediate film store (one cell per frame) is projected frame-by-frame onto a high resolution, high contrast photographic plate. Any suitable film-to-plate apparatus may be used. For example, a suitable apparatus (not shown) is one wherein the plate is mounted in a carriage which is movable in both $x$ and $y$ directions by a precision mechanism having detents at intervals of one cell size. After each exposure, the plate is moved to a new position and another frame (cell) then exposed on the plate. After all frames making up the matrix are exposed, the plate is developed and fixed in conventional fashion.

*System*

A single kinescope portion of a memory system according to the present invention is shown in FIG. 2. The memory capacity can be expanded by any desired amount by adding the required number of kinescope portions. A 24 bit data address is applied via lead 10 to bit sorter 12. The data address may be supplied from any suitable source, as by example, a control unit of a digital computer. Lead 10 is also connected by lead 15 to a timer located in the computer and shown as a single block 14. The arrow on lead 15 indicates that the memory is timed from the data address input source. In this mode of operation, the timer senses the appearance of a new address code at lead 15, waits until the bits in the memory requested by the address have been selected, then transfers the memory output on lead 36 to output register 39. Alternatively, the timing signals may be supplied by a central timing source in which case the timer 14 may be dispensed with.

The bit sorter 12 functions to apply 10 selected bits in the data address to the digital-to-analog converter 16, and 14 selected bits to the digital-to-analog converter 18. The first 10 bits of the address may go to digital-to-analog converter 16 and the last 14 bits to digital-to-analog converter 18. Each digital-to-analog converter converts its input digital information to $x$ and $y$ deflection voltages. The analog voltages from converter 16 are applied through deflection amplifier 18 to the $x$ (horizontal) and $y$ (vertical) deflection means of kinescope 20, and the $x$ and $y$ deflection voltages from converter 18 are applied through deflection amplifier 22 to image dissector 24.

The purpose of the kinescope 20 is to select one of the $10^3$ cells in the optical storage matrix. $10^3$ cells implies $10^3$ discrete positions of the electron beam and thus 10 bits ($2^0$ or 1024 binary numbers) are sufficient to control the $x$ and $y$ deflection voltages.

In one form of the present invention, the intense spot of light formed on the screen of the kinescope is optically focused by a lens shown schematically at 26 onto a selected cell in the optical storage matrix. The cell thus illuminated is focused by a field lens 28 and a second lens 30 onto the input end of an optical tunnel 32. The function of the optical tunnel is to project the image of the selected cell, regardless of the cell position, onto the same place on the image receiving surface 34 on the image dissector 24.

The image received on the image dissector is a magnified view of the selected cell. The amount the cell is magnified depends on the types of lenses employed and their spacing. The magnification may be from 2:1 to 15:1 or more. Specific figures are discussed later.

The image dissector tube includes a photo emitting surface similar to that of an image orthicon. This surface accepts the optical image projected on it by the optical tunnel and emits electrons proportional to the illumination received at individual points. The electrons are focused onto an image point at the other or anode end of the image dissector tube. A small sampling aperture is at the electron image location. The $x$ and $y$ deflection voltages applied by amplifier 22 deflect the electron image with respect to the aperture so that a desired one of the $10^4$ bits in a cell is selected.

A signal representing the bit selected by the image selector is applied over lead 36 to a transfer gate 38 and is subsequently transferred to an output register 39. The timer 14 synchronizes this transfer of information.

The description above tells briefly how one bit of information is selected from the $10^7$ bits stored in an optical storage matrix. In a practical system there may be more than one optical storage matrix in which case each will have associated with it a kinescope, image dissector and associated elements. One memory channel is shown at the dashed block 40. In a practical system in which it is desired to obtain an output word N bits long, there are N channels such as shown. Each applies its input to transfer gate 38 and the output of register 39 is then an N bit word. A specific system of this type is illustrated in FIG. 9.

Following is a description of individual components of the system of FIG. 1.

*Bit sorter 12*

The address code, which normally comes from the computer (to which the memory may be an auxiliary element), is divided into four parts, one each for horizontal and vertical deflection of the kinescope and one each for horizontal and vertical deflection of the image dissector. The kinescope which must select one cell out of a thousand employs roughly 32 discrete vertical deflections and a like number of horizontal deflections so that 10 bits of information (5+5) must be applied to the digital-to-analog converter 16. In like manner, 14 bits of information (7 steps of vertical and 7 steps of horizontal deflection) are applied to the digital-to-analog converter 18.

The bit sorter 12 consists of a plurality of bistable elements. Since the address includes 24 bits, 24 bistable elements are required. These may be in a form of bistable multivibrators, or other commonly used bistable computer elements. If the address to the bit sorter is introduced serially, the bistable elements may be arranged as a set of four shift registers and in addition there is a gate coupled to the registers. The address first enters the first register which, for example, may be for vertical deflection of the kinescope. When this register (a five bit register) is full, it signals the gate to divert the input to the second register (for example, the register for deflecting the kinescope beam horizontally) etc. Finally, the four registers making up the bit sorter are full and the direct voltage outputs stored are applied to the digital-to-analog converters 16 and 18.

In the case of parallel input, the bit sorter may be somewhat simpler. There are now 24 input leads, one connected to each bistable element. As before, ten of the bistable elements are connected to the digital-to-analog converter 16 and fourteen are connected to the digital-to-analog converter 18.

The bit sorter 12 is reset once each cycle. The reset signal may be supplied by the data address source or may come from timer 14, as indicated by dashed line 17. In the latter case, the timer may be connected, for example, directly to the reset connection of the bistable stages of the sorter so as to return all stages to an initial condition—for example, all zero outputs, once each cycle of operation.

*Kinescope 20*

The kinescope 20 may be a standard type of flying spot scanner as, for example, the 5ZP16 or 5ZP11, each of which is capable of supplying a light output at the required brightness (about 2,000 foot lamberts) when operated with appropriate accelerating voltages as, for example, 27 kilovolts. For example, the P11 phosphor at maximum rating actually achieves a peak brightness of about 20,000 foot lamberts which is considerably higher than the brightness required (about 2,000 foot lamberts).

The brightness may be reduced by reducing the beam current. However, it is preferred to use more light than actually necessary to improve signal-to-noise ratio and compensate by reducing the gain in the electrical signal channels following the image dissector.

The voltages produced by deflection amplifier 19 are applied to the horizontal ($x$) and vertical ($y$) deflection means of the kinescope 20 and deflect the electron beam to a desired location on the screen. The beam is focused by a known kinescope lens system into a narrow beam (of square cross-section in one form of the invention and of circular cross-section in other forms of the invention) as described in more detail later.

*Lenses*

The lens 26 is a high quality photographic lens operating at approximately $F/18$ and at low magnification (2:1, for example). This lens has a small circle of confusion all over the field, about .005″. It is capable, with this resolution, of viewing the field angle represented by the matrix at about 5″ distance from the lens, or a total field angle of about 38°.

Lens 28 is a field lens whose function is to image the photographic lens 26 into the lens 30 of the optical tunnel. The lens 28 may be, for example, a single element double convex lens located close to the plane of the optical matrix, as shown, or it may be a collapsed "Fresnel" lens located at the same place.

Lens 30 may be similar to lens 26. Lens 30 has as its object the optical storage matrix; it images that matrix at the exit aperture of the optical tunnel 32. The size of this image at the exit aperture depends upon the details of the system design. For example, for a 2:1 magnification of the cell, the spacing between elements would be roughly as follows (FIG. 1 should be referred to): $a$=5″; $b$=5″; $c$=5″; $d$=10″. For a 15:1 magnification with the same optical system, the spacing is roughly as follows: $a$=5″; $b$=5″; $c$=3″; $d$=45″.

Either of the magnifications above are suitable for the system described. With the 2:1 magnification, the cell image at the dissector is 0.2″ x 0.2″; with the 15:1 magnification, the cell image at the dissector is 1.5″ x 1.5″. The 15:1 magnification eases the demands on the image dissector but increases the optical tunnel cross-section and length (the tunnel cross-section, for example, must be slightly greater than 1.5″ x 1.5″). The 2:1 magnification eases the demands on the optical tunnel but increases the resolution required of the image dissector.

In general, the space between the exit aperture of the optical tunnel 32 and the image dissector 24 is made as small as possible (the dissector 24 is normally butted against the end of the tunnel 32). If the space is too large, the exit aperture vignettes the light bundles coming from the off-axis cells, resulting in decreased illumination of the furthermost cells.

*Optical tunnel 32*

Figure 3:
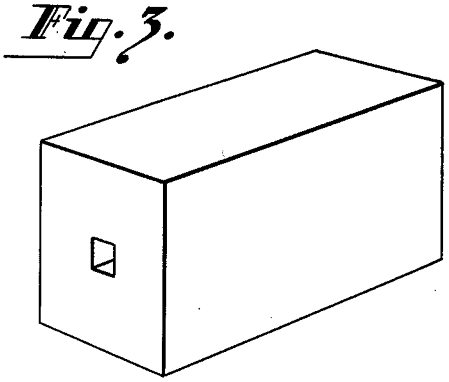
FIG. 3 is a perspective view of an optical tunnel.

The purpose of the optical tunnel 32 is to permit the observation of a field of view in such a way that any given point or area in this entire field of view appears at exactly the same location in the image plane (the image receiving area of the dissector 24). The tunnel may appear as shown in FIG. 3. It may be formed of four blocks of optical glass, as shown, placed together so as to form a central opening or "tunnel" of square cross-section. A tunnel designed for use in the memory system of the present invention, in which each cell of the optical storage matrix is .1″ x .1″ square and in which the cell magnification is 2:1, may have a tunnel of about 0.2″ x 0.2″ internal cross-section and a length of approximately 10″. The tunnel dimensions, in general, depend on the focal length of the lens used with the tunnel, and are predicated in the present case on a 4″ focal length lens, and a 2:1 image magnification from the matrix to the output end of the tunnel. The tunnel is constructed of glass for stability and optical reasons. The internal reflecting mirror surfaces of the tunnel may be made by vacuum aluminizing the internal polished walls. It is also possible to use a tunnel of triangular or other regular polygon cross-sections; however, one of square cross-section is preferred.

The operation of the tunnel is shown schematically in FIG. 4. Only two mirrors are shown for the sake of simplicity. If the mirrors were not present, the lens 42 (which is the same as lens 30 of FIG. 2) would image the points $a$–$e$ in the object plane as points $a'$–$e'$ in the image plane. The mirrors allow the point $e$ which is at the center of the object plane 41 to be imaged at point $e'$ as before, but point $d$ undergoes a reflection at one face 46 of the mirrors and is imaged at point $e'$. Point $c$ is reflected from the upper mirror at point 48 and from the lower mirror at point 50 and is also imaged on $e'$. Similarly points $a$, $b$, $f$, and all others in the object plane will be imaged at point $e'$. In a like manner, cells such as those in row $e$, columns 1–4 (FIG. 4$a$) are reflected between the two side walls of the mirror onto point $e'$. Cells on the diagonal such as $a$-1, $b$-2, etc., are reflected from the corners of the mirror tunnel in a manner similar to that occurring in a roof mirror. Some cells undergo combinations of corner reflections and flat wall reflections, however, all are finally superimposed in the image space.

In the present invention only one cell of $10^3$ cells is illuminated. Therefore, only that one appears at the image plane 44. This cell may appear right side up, on its side, or upside down at the image plane depending upon the number and types of reflections made in the optical tunnel. It is desirable that all cells appear right side up at the image plane. This is accomplished here by properly orienting the cells in the optical storage matrix so that they all appear right side up at the image plane 44.

*Image dissector 24*

The image dissector is shown in schematic form in FIG. 5. It includes a photo-emitting surface similar to that of the image orthicon. The surface is shown at 52 and consists of a translucent photo-cathode. This surface accepts the optical image projected on it by the optical tunnel and emits electrons in proportion to the illumination magnitude at individual points. The electrons are focused by means of an electron lens system which includes the accelerator lens 54 and the deflection coils 56, 58 and focusing coil 60. The lens system focuses the electron image on an image plane at the end of the tube adjacent to anode 62. A small sampling aperture 64 is located at the electron image plane. Behind this aperture is a series of secondary emission multiplying stages such as in the image orthicon. The deflection voltages from the deflection amplifier 22 (FIG. 1) are applied to the deflection coils (FIG. 5) and the amount of light in a desired area of the electron image of the cell may thereby be sampled and measured.

The image dissector discussed above is a well-known arrangement and is commercially available. Early forms of these tubes are described in Farnsworth Patent Nos. 1,773,980 and 2,026,379.

*Digital-to-analog converters 16, 18*

The purpose of the digital-to-analog converter is to convert the data address to an analog voltage which deflects the electron beam, in the case of the kinescope, or the image, in the case of the image dissector, a desired amount. Since the kinescope beam must be capable of being deflected to select one of a thousand cells, the address applied to the digital-to-analog converter 16 (FIG. 1) includes 10 bits ($2^{10}=1024$). In a similar manner, since the image dissector must select one bit out of 10,000, the address to the digital-to-analog converter 18 includes 14 bits ($2^{14}=16384$, $2^{13}=8192$).

As will be understood by those skilled in the art, the digital-to-analog converters 16 and 18 convert the input address to two analog quantities, one for producing $x$ deflection and the other for producing $y$ deflection. If the storage matrix is square, as shown, and contains roughly 32 cells by 32 cells then the first 5 bits of the address may be converted to the $x$ deflection voltage ($2^5=32$) and the second 5 bits may be converted to the $y$ deflection voltage. In a similar manner, digital-to-analog converter 18 may convert the first 7 bits of its 14 bit address to an $x$ analog quantity and the second 7 bits to a $y$ analog quantity.

One of any number of known digital-to-analog converters may be used for blocks 16 and 18. A specific one is shown in FIG. 10 by way of illustration. Referring to the figure, a direct voltage source which supplies an output voltage $+E_1$ is connected to terminal 90. This terminal is connected through five parallel channels to a summing resistor 92. The five paths include resistors 93–97, respectively, and each have values such that they pass currents in proportions 1, 2, 4, 8, and 16, respectively, when the channel conducts. The five channels also include diodes 103 to 107 having anodes connected respectively to the resistors 93 to 97, respectively, and cathodes connected to the summing resistor 92. Signals applied to diodes 98–102 respectively having anodes connected to the anodes of diodes 103 to 107, respectively, determine whether the respective channels conduct or not. When a negative pulse is applied to the cathode of one of diodes 98–102, that one diode conducts and the corresponding diode to which that one diode is connected in a channel is cut-off.

The five inputs to the converter may be applied in parallel to the terminals legended $2^0$–$2^4$. The application to a terminal of a positive voltage of the order of +2 volts is indicative of the binary digit one and the application to a terminal of a negative voltage of the order of −2 volts is indicative of the binary digit zero.

In operation, a five digit code is applied to the input terminals $2^0$–$2^4$. The five current branches contribute current to summing resistor 92 in accordance with the input code, and the voltage $e_0$ appearing across summing resistor 92 is the analog of the input code. An input bias is provided by a constant negative voltage $-E_2$ applied to terminal 108.

The output voltage $e_0$ in the converter may be amplified to a power level suitable for deflecting the kinescope (or dissector). The amplification is straightforward linear amplification and depends in its details on the type of deflection employed (magnetic or electrostatic) as well as on the specific cathode ray beam deflection device parameters.

Some specific values of components for the circuit shown in FIG. 10 are as follows.

$E_1=+250$
$E_2=-250$
Resistor 92=500 ohms
Resistor 97=250,000 ohms.
Resistor 96=500,000 ohms
Resistor 95=1 megohm
Resistor 94=2 megohms
Resistor 93=4 megohms
$e_0=-.5$ volt for an input binary number representing 0
$e_0=0.47$ volt for an input binary number representing 31

*Transfer gate 38 and output register 39*

The transfer gate 38 (FIG. 1) may comprise a plurality of "and" circuits. There are the same number of "and" circuits as there are bits of information in an output word. All "and" circuits are connected in parallel to the timer 14 and each is individually connected to a different storage channel 40. Upon receipt of a pulse from timer 14, the transfer gate 38 transfer the information present on leads 36–36N to the corresponding stages of the output register 39. For example, if a high voltage on lead 36 represents the digit one and a low voltage the digit zero, the coincidence of the high voltage on lead 36 and a pulse from timer 14 actuates a corresponding "and" gate and a pulse is applied from lead 36 through the actuated "and" gate to the output register 39. The function of the transfer gate, in brief, is to allow a sample of the output of the image dissector to be obtained after transients due to the selection of the bit have died away.

The output register 39 may be conventional. It may consist of N bistable multivibrators, magnetic memory cores, or other known bistable elements, where N is the number of bits. The register may be reset by a pulse from timer 14 prior to the time information is transferred to it from transfer gate 38. This may be done in a known way as, for example, by first applying a reset pulse to the register and then delaying the pulse before it is applied to the transfer gate. Alternatively, the system may be of the type in which the new information transferred under the influence of the timing pulse applied to gate 38 erases the information previously stored in register 39. The stages of the various stages of the output register represent the output binary number.

The output register may be read serially or in parallel. In the former mode of operation, pulses are applied to the register to step the information stored there from stage to stage so that a serial N bit output word is obtained. In the latter mode of operation, an output transfer gate (not shown) may be connected to the output register and the information read out by applying a suitably delayed pulse from timer 14 to such output transfer gate. In this case, the output transfer gate may consist of N "and" gates similar to the transfer gate 38.

*Modified circuits*

A modified form of a portion of the system is shown in FIG. 6. In the arrangement of FIG. 2, the optical storage matrix is spaced from the kinescope and the bright spot on the kinescope screen is focused onto the matrix by a lens 26. In the embodiment of FIG. 6, fiber optics (closely spaced parallel glass fibers of small diameter) 70 are substituted for the lens 26. The fibers are sealed into the end of the kinescope and the phosphor is coated directly onto one end of the fibers. The storage matrix is placed immediately adjacent to the other end of the fibers.

The lens 72 may be similar to lens 30 of FIG. 2 and the optical tunnel 74 like tunnel 32 of FIG. 2.

Several modes of operation are possible for the arrangement shown in FIG. 6. One is illustrated schematically in FIG. 7. In this mode of operation, the electron beam produced by kinescope 76 is of square cross-section. A beam of this type is obtained by replacing the conventional round aperture in the kinescope electron gun by a square aperture, and focusing the resulting beam by means of a standard kinescope electron lens. With a kinescope of this type, the glass fibers in the fiber optics face-plate may be of the order of 0.001″ in diameter or smaller. The square electron beam is then focused by the electron lens system into a beam of uniform cross-section 0.1″ x 0.1″ at the phosphor. The small fibers have more than ample resolution for transmitting the 0.1″ x 0.1″ square area illuminated by the electron beam to the 0.1″ x 0.1″ cell of the storage matrix.

In another mode of the operation of FIG. 6, fiber optics of the same type as the above are employed. However, the beam is of conventional circular cross-section, and may have a cross-sectional diameter of .005″ or greater at the phosphor. Now, however, rather than remaining stationary as in the case of the square beam, deflection voltages are applied to the electron lens system to scan the electron beam over the 0.1″ x 0.1″ cell area. The advantage of scanning the phosphor with a fine beam over using a stationary square beam is that a conventional kinescope may be employed.

A third mode of operation of the embodiment of FIG.

6 is illustrated in FIG. 8. A kinescope employing a conventional beam is used but the fibers of the fiber optics plate are square and each is 0.1″ x 0.1″ in cross section. Thus, each fiber comprises a "light pipe" whose exit aperture exactly fits its associated matrix cell. The light input to the electron beam end of the pipe need not be in the form of a square since the pipe acts as a diffuser due to numerous internal reflections. Thus, the light spot on the phosphor can be of any shape or size as long as it lies entirely within the square end of the specified pipe. For example, the electron beam may have a diameter of .05″ (a somewhat defocused beam) and may be centered on a pipe. Thus, the beam deflection need be accurate to only ±0.025″. In this form of the invention, the face-plate thickness, that is, the length of each pipe, should be great enough to insure adequate diffusion of the output light over the exit aperture. For a 0.1″ cross-section, a pipe length of about ½″ to 1″ is suitable.

The fiber optics face-plate of this third embodiment may be made by assembling a number of square rods of high-index glass in a fixture with small spacing between them, filling the spacing with powdered, low-index material of lower melting point than the rods, heating the entire assembly so as to fuse the powdered material thus making a monolithic block, and then grinding and polishing the front and back surfaces of the block. The fiber optics for the first and second embodiments of the invention can be made in a similar manner. The finished face-plate is sealed into the tube and the phosphor deposited in conventional manner.

FIGS. 7 and 8 illustrate schematically the mode of operation of the first and third embodiments of the invention described above.

A complete memory system employing 38 channels is illustrated in block diagram form in FIG. 9. Elements similar in function to those of the corresponding elements of FIG. 1 have similar reference numerals applied. The mode of operation of the system of FIG. 9 is believed to be clear from the description of FIG. 1.

What is claimed is:

1. In an optical memory, a single stationary optical storage matrix made up of a plurality of cells, each of the cells including substantially opaque marks indicative of binary digits of one value and substantially transparent marks indicative of binary digits of another value; means for illuminating a selected cell in said matrix while the other cells remain unilluminated; means for magnifying and projecting an image of said selected cell, whatever its location in said matrix, onto a common location in an image plane; and means for selecting from the magnified image of said cell in said image plane a mark at a desired location in said cell.

2. In an optical memory, an optical storage matrix made up of a plurality of cells, each of the cells including substantially opaque marks indicative of binary digits of one value and substantially transparent marks indicative of binary digits of another value; means for illuminating a selected cell in said matrix, said means including a cathode ray device the face-plate of which is formed of glass fibers, the inner ends of said fibers being coated with a phosphor and located within said device, and said matrix being located adjacent to the outer ends of said fibers; means for magnifying and projecting an image of said selected cell, whatever its location in said matrix, onto the same place in an image plane; and means for selecting from the magnified image of said cell in said image plane a mark at a desired location in said cell.

3. In a memory as set forth in claim 2, the cross-sectional area of each glass fiber being substantially smaller than the cross-sectional area of a cell.

4. In a memory as set forth in claim 3, each of said cells being of substantially square cross-section, and said cathode ray device including means providing an electron beam of substantially square cross-section and of the same size as the cell.

5. In the combination as set forth in claim 3, said means for illuminating a selected cell further including means producing an electron beam having a cross-sectional area which is a small fraction of the cell area, and means for scanning said beam over the area of a selected cell.

6. In an optical memory as set forth in claim 2, the cross-section of each glass fiber corresponding to the cross-section of a cell, and said fibers being arranged each to register with a different cell.

7. In an optical memory, an optical storage matrix made up of a plurality of cells, each of the cells including substantially opaque marks indicative of binary digits of one value and substantially transparent marks indicative of binary digits of another value; means for illuminating a selected cell in said matrix, said means including a cathode ray device the face-plate of which is formed of glass fibers, the inner ends of said fibers being coated with a phosphor and located within said device, and said matrix being located adjacent to the outer ends of said fibers; means including an optical tunnel for magnifying and projecting an image of said selected cell, whatever its location in said matrix, onto the same place in an image plane; and means for selecting from the magnified image of said cell in said image plane a mark at a desired location in said cell.

8. In an optical memory, an optical storage matrix made up of a plurality of cells, each of the cells including substantially opaque marks indicative of binary digits of one value and substantially transparent marks indicative of binary digits of another value; means for illuminating a selected cell in said matrix, said means including a cathode ray device the face-plate of which is formed of glass fibers, the inner ends of said fibers being coated with a phosphor and located within said device, and said matrix being located adjacent to the outer ends of said fibers; means including optical tunnel for magnifying and projecting an image of said selected cell, whatever its location in said matrix, onto the same place in an image plane; and means including an image dissector for scanning the magnified image of said cell and selecting marks at desired locations in said cell.

9. In a memory, a single stationary optical storage medium which is made up of cells, each cell including transparent marks indicative of binary digits of one value and opaque marks indicative of binary digits of another value, the total number of transparent and opaque marks per cell equalling at least a hundred; means including a cathode ray device for illuminating a selected cell on said medium; an electronic scanning device for selecting a mark at a desired location in the cell selected; and means including an optical tunnel for projecting an image of the selected cell onto the same location on said electronic scanning device regardless of the location of the cell on said storage medium.

10. In a memory, a single stationary optical storage medium divided into a plurality of sub-areas, each said sub-area including a plurality of marks, some transparent and indicative of binary digits of one value and others opaque and indicative of binary digits of another value; means including a cathode ray device for illuminating one sub-area of said medium while the remaining sub-areas remain unilluminated; an image dissector for selecting a mark at a desired location in said sub-area, said dissector including a photocathode; means for projecting an image of said sub-area, whatever its location on said medium, onto a common location on said photocathode; and deflection circuits coupled to said image dissector for deflecting the image projected onto said photocathode for selecting a mark at a desired location in said sub-area.

11. In combination, a stationary optical storage medium divided into a plurality of sub-areas, each said sub-area defining a plurality of storage locations; means for illuminating any one of said sub-areas, regardless of its location on the storage medium, while the remaining sub-areas remain unilluminated; an electronic scanning device for selecting from said illuminated sub-area one of the storage locations therein; and means for optically projecting an image of said illuminated sub-area whatever its location on said storage medium onto a common location of said electronic scanning device.

12. The combination set forth in claim 11, further including means for generating an address binary word, one portion of which is indicative of the sub-area of the storage medium which is to be selected and another portion of which is indicative of the storage location desired in the selected sub-area; and means responsive to said binary word for effecting the illumination of said sub-area and effecting the selection by the electronic scanning device of the desired storage location in said sub-area.

References Cited by the Examiner

UNITED STATES PATENTS

| | | | |
|---|---|---|---|
| 2,510,200 | 6/50 | Thompson | 88—24 |
| 2,725,786 | 12/55 | McCarthy | 88—1 |
| 2,830,285 | 4/58 | Davis et al. | 340—173 |
| 2,938,666 | 5/60 | Rand | 235—61.11 |
| 3,106,700 | 10/63 | Newberry | 340—173 |

IRVING L. SRAGOW, *Primary Exminer.*

EVERETT R. REYNOLDS, *Examiner.*